United States Patent
Huang et al.

(10) Patent No.: US 9,337,644 B2
(45) Date of Patent: May 10, 2016

(54) ESD PROTECTION CIRCUIT

(71) Applicant: MediaTek Inc., Hsin-Chu (TW)

(72) Inventors: Bo-Shih Huang, Hsinchu (TW);
Tsung-Ming Chen, Zhubei (TW);
Yuan-Hung Chung, Zhubei (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 13/662,851

(22) Filed: Oct. 29, 2012

(65) Prior Publication Data

US 2013/0114172 A1  May 9, 2013

Related U.S. Application Data

(60) Provisional application No. 61/557,553, filed on Nov. 9, 2011, provisional application No. 61/595,956, filed on Feb. 7, 2012.

(51) Int. Cl.

| H01C 7/12 | (2006.01) |
| H02H 1/00 | (2006.01) |
| H02H 1/04 | (2006.01) |
| H02H 3/22 | (2006.01) |
| H02H 9/06 | (2006.01) |
| H02H 3/20 | (2006.01) |
| H02H 9/04 | (2006.01) |

(52) U.S. Cl.
CPC ........ *H02H 3/20* (2013.01); *H02H 9/046* (2013.01)
USPC .................................................. 361/56

(58) Field of Classification Search
CPC ...................................... H01L 27/0248
USPC .................................................. 361/56
See application file for complete search history.

(56) References Cited

U.S. PATENT DOCUMENTS

| 6,980,408 | B2* | 12/2005 | Sakihama et al. | 361/91.1 |
| 7,518,841 | B2* | 4/2009 | Chuang et al. | 361/56 |
| 7,974,053 | B2* | 7/2011 | Ker et al. | 361/56 |
| 8,400,742 | B2* | 3/2013 | Lai et al. | 361/56 |
| 2002/0008563 | A1* | 1/2002 | Lin | 327/310 |
| 2003/0128486 | A1 | 7/2003 | Chuang et al. | |
| 2003/0206045 | A1* | 11/2003 | Mallikarjunaswamy | 327/310 |
| 2006/0092590 | A1 | 5/2006 | Chuang et al. | |
| 2007/0284666 | A1* | 12/2007 | Duvvury et al. | 257/360 |

* cited by examiner

*Primary Examiner* — Dharti Patel
(74) *Attorney, Agent, or Firm* — McClure, Qualey & Rodack, LLP

(57) ABSTRACT

An electrostatic discharge (ESD) protection circuit is provided. The ESD protection circuit includes an impedance device coupled between a pad and a power line and a clamp unit coupled between the pad and a ground line.

14 Claims, 6 Drawing Sheets

ESD PROTECTION CIRCUIT

CROSS REFERENCE TO RELATED APPLICATIONS

This application claims the benefit of U.S. Provisional Application No. 61/557,553, filed on Nov. 9, 2011, and U.S. Provisional Application No. 61/595,956, filed on Feb. 7, 2012, the entireties of which are incorporated by reference herein.

BACKGROUND OF THE INVENTION

1. Field of the Invention

The invention relates to an electrostatic discharge (ESD) protection circuit, and more particularly to an ESD protection circuit with high power supply rejection ratio (PSRR).

2. Description of the Related Art

An electrostatic discharge (ESD) event is an important reliability issue for integrated circuits (ICs). To meet component-level ESD reliability, on-chip ESD protection circuits are implemented in the input/output (I/O) cells and power/ground cells of complementary metal-oxide semiconductor (CMOS) ICs.

With the continued miniaturization of IC devices, the current trend in the sub-micron CMOS technology is to produce integrated circuits with shallower junction depths, thinner gate oxides, lightly-doped drain (LDD) structures, shallow trench isolation structures, and silicide processes. However, the advanced IC devices also become more susceptible to ESD damage. ESD phenomenon occurs when excess charges are transmitted from the I/O pin to the integrated circuit too quickly, which damages the internal circuit. Therefore, ESD protection circuits are built onto the chip to protect the devices and circuits of the IC against ESD damage.

BRIEF SUMMARY OF THE INVENTION

Electrostatic discharge (ESD) protection circuits are provided. An embodiment of an ESD protection circuit is provided. The ESD protection circuit comprises an impedance device coupled between a pad and a power line, and a first clamp unit coupled between the pad and a ground line.

Furthermore, another embodiment of an ESD protection circuit is provided. The ESD protection circuit comprises: a first resistor coupled to a power line; a first clamp unit coupled between the first resistor and a ground line; a second clamp unit coupled between the first resistor and a pad; a third clamp unit coupled between the pad and the ground line; and a bias unit coupled to the pad. The second clamp unit conducts an ESD current caused by positive voltage ESD pulses from the pad to the first clamp unit. The third clamp unit conducts an ESD current by negative voltage ESD pulses from the ground line to the pad. The bias unit provides a bias voltage at the pad.

Moreover, another embodiment of an ESD protection circuit is provided. The ESD protection circuit comprises: an inductor coupled between a power line and a pad; a first clamp unit coupled between the pad and a ground line; a first resister coupled between the pad and the first clamp unit; and a second clamp unit coupled in parallel with the first resister. The second clamp unit conducts an ESD current caused by positive voltage ESD pulses from the pad to the first clamp unit.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
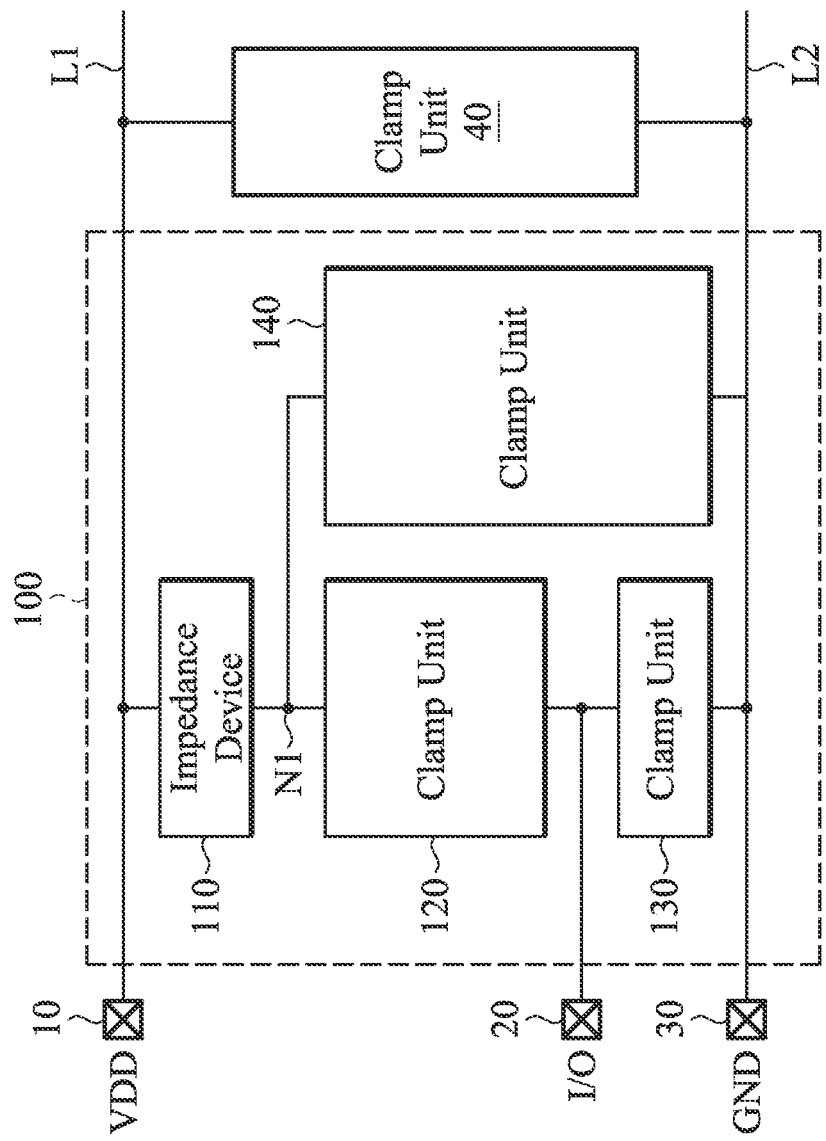
FIG. 1 shows an electrostatic discharge (ESD) protection circuit according to an embodiment of the invention.

FIG. 1 shows an electrostatic discharge (ESD) protection circuit 100 according to an embodiment of the invention. The ESD protection circuit 100 is implemented in an integrated circuit (IC), wherein the ESD protection circuit 100 can provide ESD protection for an input/output (I/O) pad 20 of the IC. The ESD protection circuit 100 comprises an impedance device 110 and the clamp units 120, 130 and 140. In the IC, the ESD protection circuit 100 is coupled to a power pad 10 and a ground pad 30 via a power line L1 and a ground line L2, respectively. A power voltage VDD is applied to the power pad 10 and the ground pad 30 is grounded when the IC is operated in a normal operation. Furthermore, a clamp unit 40 coupled between the power line L1 and the ground line L2 can provide ESD protection for the power pad 10 and the ground pad 30 in the IC. In the ESD protection circuit 100, the impedance device 110 is coupled between the power line L1 and a node N1, which is a high impedance device for providing a weak pull high for the node N1. The clamp unit 140 is coupled between the node N1 and the ground line L2. The clamp unit 120 is coupled between the node N1 and the I/O pad 20. The clamp unit 120 is used to conduct an ESD current caused by positive voltage ESD pulses from the I/O pad 20 to the clamp unit 140, so as to conduct the ESD current caused by positive voltage ESD pulses to the ground line L2. Furthermore, the clamp unit 130 is coupled between the I/O pad 20 and the ground line L2, and the clamp unit 130 is used to conduct an ESD current caused by negative voltage ESD pulses from the ground line L2 to the I/O pad 20. In one embodiment, the clamp units 140 and 40 may have the same architecture for simplifying design complexity. In another embodiment, the ESD protection circuit 100 further comprises the clamp unit 40.

Figure 2:
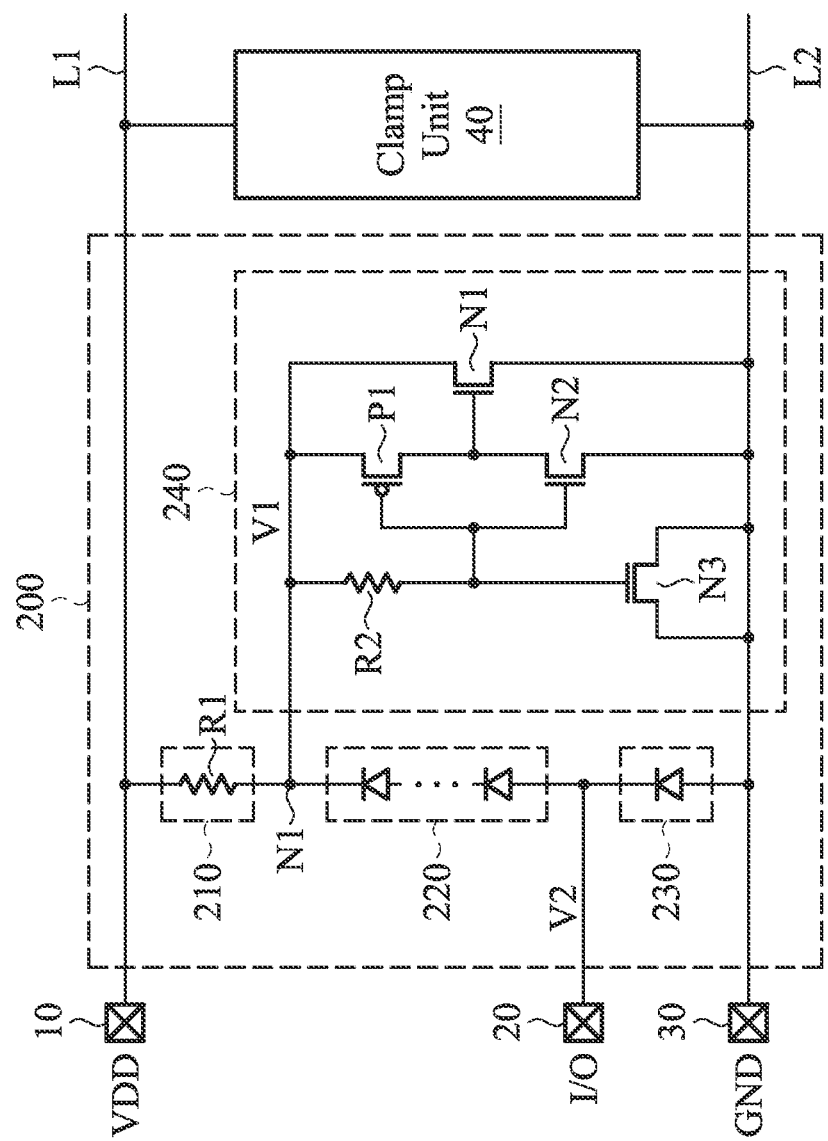
FIG. 2 shows an ESD protection circuit according to another embodiment of the invention.

FIG. 2 shows an ESD protection circuit 200 according to another embodiment of the invention. An impedance device 210 comprises a resistor R1 coupled between the power line L1 and the node N1, wherein the resistor R1 has a high resistance (i.e. high impedance). The clamp unit 220 comprises a diode chain, wherein the diode chain is formed by a plurality of diodes connected in series. In the clamp unit 220, each diode is coupled in a forward conduction direction from the I/O pad 20 to the node N1. Thus, the clamp unit 220 is capable of conducting an ESD current from the I/O pad 20 to the node N1 when positive voltage ESD pulses occur at the I/O pad 20. Furthermore, the clamp unit 230 comprises a diode coupled in a forward conduction direction from the ground line L2 to the I/O pad 20, so the clamp unit 230 is capable of conducting an ESD current from the ground line L2 to the I/O pad 20 when negative voltage ESD pulses occur at the I/O pad 20. In the embodiment, the amount of the diodes of the clamp units 220 and 230 are used as an example for description, and does not limit the invention. Furthermore, the diodes of the clamp unit 220 may be formed by the diode-connected PMOS transistors, and the diodes of the clamp unit 230 may be formed by the diode-connected NMOS transistor. In the embodiment, no current flows through the clamp units 220 and 230 under a normal operation (i.e. no ESD event occurs), thus a voltage V1 of the node N1 is pulled high to the power voltage VDD. The clamp unit 240 comprises the NMOS transistors N1, N2 and N3, a PMOS transistor P1 and a resistor R2. The NMOS transistor N1 is coupled between the node N1 and the ground line L2. The PMOS transistor P1 is coupled between the node N1 and a gate of the NMOS transistor N1, and the NMOS transistor N2 is coupled between the gate of the NMOS transistor N1 and the ground line L2, wherein the gates of the PMOS transistor P1 and the NMOS transistor N2 are connected together. A terminal of the resistor R2 is coupled to the node N1 and another terminal of the resistor R2 is coupled to the gate of the PMOS transistor P1 and the gates of the NMOS transistors N2 and N3. It is noted that the drain and source of the NMOS transistor N3 are coupled to the ground line L2 together, thus the NMOS transistor N3 functions as a capacitor. In FIG. 2, a swing voltage of a signal at the I/O pad 20 can exceed a voltage level of the power voltage VDD due to the resistor R1 can avoid the swing voltage of the signal at the I/O pad 20 influences the power voltage VDD. Moreover, the resistor R1 may provide rejection for high frequency noises. Furthermore, the ESD protection circuit 200 is suitable for RF and oscillator applications because of low loading of the clamp units 220 and 230. Furthermore, power supply rejection ratio (PSRR) is increased because the power voltage VDD is isolated with the resistor R1. In one embodiment, the ESD protection circuit 200 further comprises the clamp unit 40.

Figure 3:
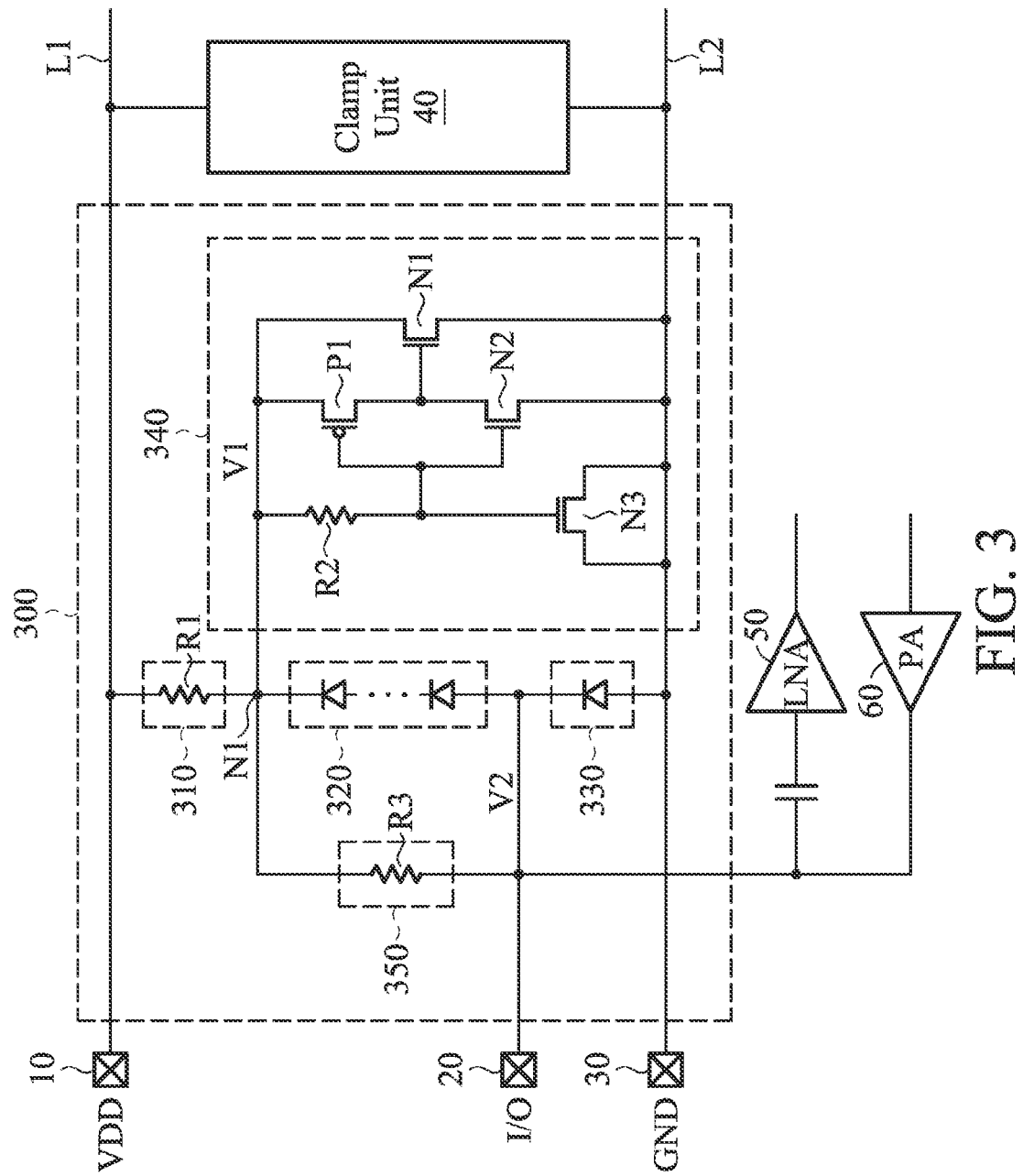
FIG. 3 shows an ESD protection circuit according to another embodiment of the invention.

FIG. 3 shows an ESD protection circuit 300 according to another embodiment of the invention. Compared with the ESD protection circuit 200 of FIG. 2, the ESD protection circuit 300 further comprises a bias unit 350 coupled between the node N1 and the I/O pad 20, wherein the bias unit 350 comprises a resistor R3 coupled in parallel with the clamp unit 320. A voltage V2 of the I/O pad 20 is biased to the voltage level of the power voltage VDD via the resistors R1 and R3. In the embodiment, the I/O pad 20 is a shared pad for a low noise amplifier (LNA) 50 and a power amplifier (PA) 60. To avoid the situation where a high swing signal provided by the PA 60 induces the diode between the I/O pad 20 and the clamp unit 340 to turn on, a stacked diode chain is necessary in the clamp unit 320. In the embodiment, a voltage swing at the I/O pad 20 should be smaller than a voltage level $V_{SW1}$ ($V_{SW1}=V_D \times N+V_{RLB}$), where $V_D$ represents a built-in voltage of a diode (e.g. 0.7V), N represents the number of the stacked diodes of the clamp unit 320, and $V_{RLB}$ represents a maximum voltage level of the voltage V1 that is determined according to the reliability of the clamp unit 340. Furthermore, to avoid turning on the diode of the clamp unit 330, the voltage swing at the I/O pad 20 should be smaller than a voltage level $V_{SW2}$ ($V_{SW2}=VDD+V_D$), where $V_D$ represents a built-in voltage of a diode (e.g. 0.7V). Therefore, a maximum allowable voltage swing at the I/O pad 20 is a minimum value between the voltage levels $V_{SW1}$ and $V_{SW2}$. Because the DC level of the I/O pad 20 is biased at a higher voltage level (i.e. VDD), only a single diode has the capability to avoid the situation where the clamp unit 330 turns on. Thus, a deep N-well process may not be necessary. In one embodiment, the ESD protection circuit 300 further comprises the clamp unit 40.

Figure 4:
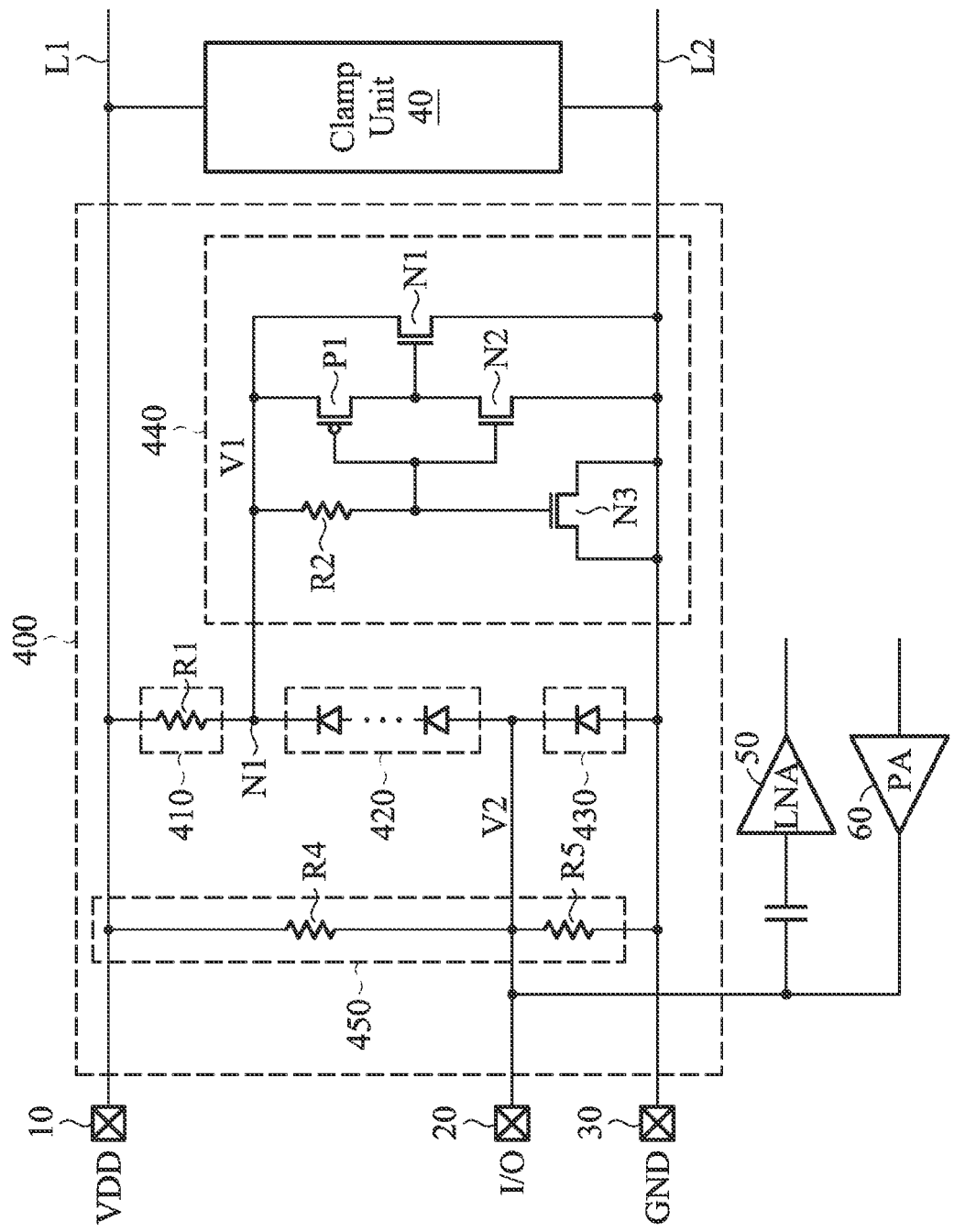
FIG. 4 shows an ESD protection circuit according to another embodiment of the invention.

FIG. 4 shows an ESD protection circuit 400 according to another embodiment of the invention. In the ESD protection circuit 400, a bias unit 450 comprises a resistor R4 coupled between the power line L1 and the I/O pad 20, and a resistor R5 coupled between the I/O pad 20 and the ground line L2, wherein the resistors R4 and R5 have high resistances. Compared with the bias unit 350 of FIG. 3, the voltage V2 of the I/O pad 20 can be biased to a desired DC voltage level (e.g. VDD/2) according to a ratio of the resistors R4 and R5 of the bias unit 450, i.e. V2=VDD×R5/(R4+R5). Therefore, junction capacitance variation of the diodes of the clamp units 420 and 430 are decreased (i.e. diode junction capacitances are insensitive to the voltage swing at the I/O pad 20 under larger reverse biasing conditions). Thus, better linearity can be achieved. In the embodiment, a voltage swing at the I/O pad 20 should be smaller than a voltage level $V_{SW3}$ ($V_{SW3}=V_D \times N+V_{RLB}+(VDD-VDD \times R5/(R4+R5)))$, where $V_D$ represents a built-in voltage of a diode (e.g. 0.7V), N represents the number of the stacked diodes of the clamp unit 420, and $V_{RLB}$ represents a maximum voltage level of the voltage V1 that is determined according to the reliability of the clamp unit 440. Furthermore, to avoid turning on the diode of the clamp unit 430, the voltage swing at the I/O pad 20 should be smaller than a voltage level $V_{SW4}$ ($V_{SW4}=VDD+V_D-VDD \times R5/(R4+R5)$), where $V_D$ represents a built-in voltage of a diode (e.g. 0.7V). Therefore, a maximum allowable voltage swing at the I/O pad 20 is a minimum value between the voltage levels $V_{SW3}$ and $V_{SW4}$. In one embodiment, the ESD protection circuit 400 further comprises the clamp unit 40.

Figure 5:
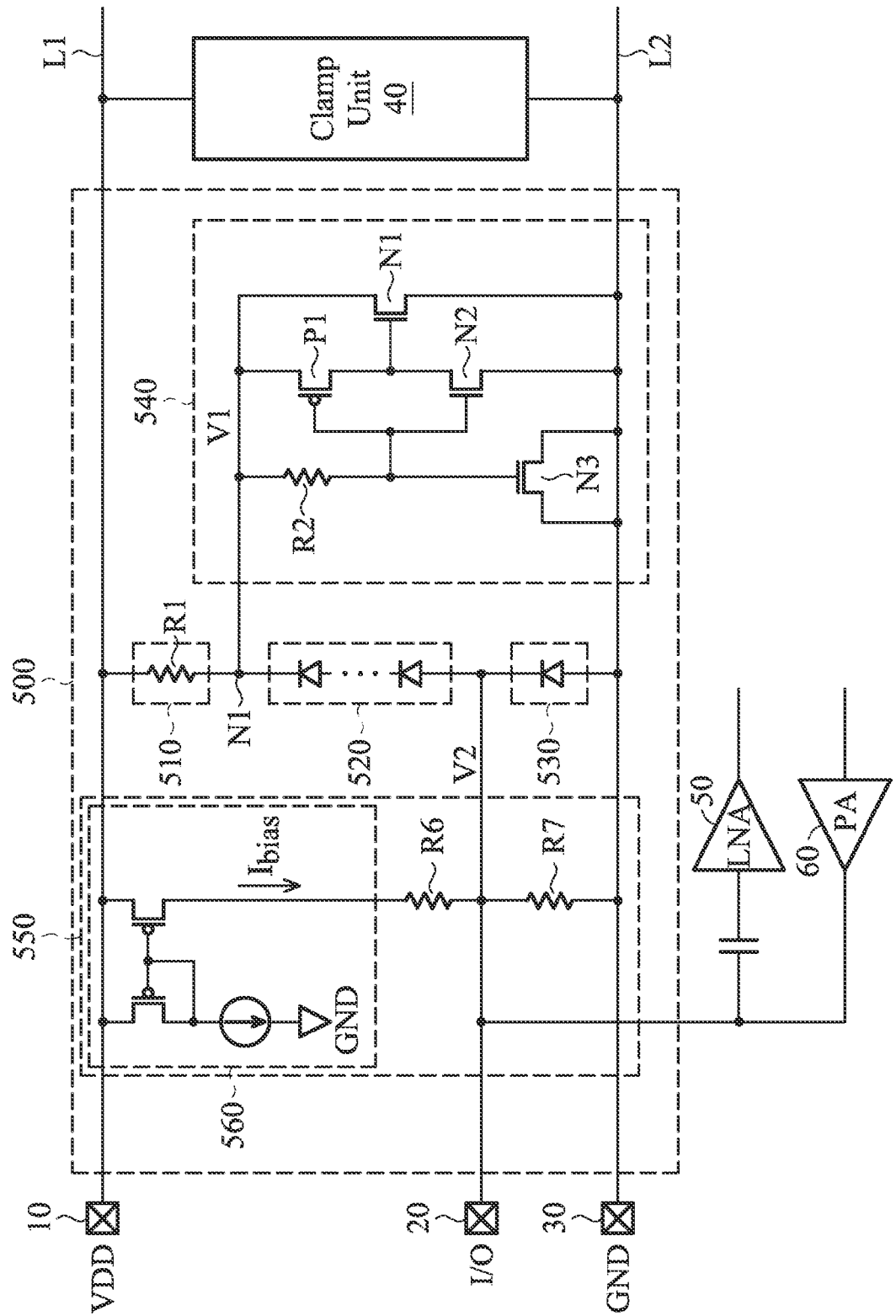
FIG. 5 shows an ESD protection circuit according to another embodiment of the invention.

FIG. 5 shows an ESD protection circuit 500 according to another embodiment of the invention. In the ESD protection circuit 500, a bias unit 550 comprises a current mirror unit 560 and two resistors R6 and R7. The current mirror unit 560 is coupled to the power line L1 and the resistor R6, which provides a bias current $I_{bias}$ to the resistor R6. The resistor R6 is coupled between the current mirror unit 560 and the I/O pad 20, and the resistor R7 is coupled between the I/O pad 20 and the ground line L2. Similarly, the voltage V2 of the I/O pad 20 can be biased to a desired DC voltage level according to the resistor R7 and the bias current $I_{bias}$ of the bias unit 550, i.e. V2=$I_{bias}$×R7. Therefore, junction capacitance variation of the diodes of the clamp units 520 and 530 are decreased (i.e. diode junction capacitances are insensitive to the voltage swing at the I/O pad 20 under larger reverse biasing conditions), and better linearity can be achieved. In the embodiment, the voltage swing at the I/O pad 20 should be smaller than a voltage level $V_{SW5}$ ($V_{SW5}=V_D \times N+V_{RLB}+(VDD-I_{bias} \times R7)$), where $V_D$ represents a built-in voltage of a diode (e.g. 0.7V), N represents the number of the stacked diodes of the clamp unit 520, and $V_{RLB}$ represents a maximum voltage level of the voltage V1 that is determined according to the reliability of the clamp unit 540. Furthermore, to avoid turning on the diode of the clamp unit 530, the voltage swing at the I/O pad 20 should be smaller than a voltage level $V_{SW6}$ ($V_{SW6}=VDD+V_D-I_{bias} \times R7$), where $V_D$ represents a built-in voltage of a diode (e.g. 0.7V). Therefore, a maximum allowable voltage swing at the I/O pad 20 is a minimum value between the voltage levels $V_{SW5}$ and $V_{SW6}$. In one embodiment, the ESD protection circuit 500 further comprises the clamp unit 40.

Figure 6:
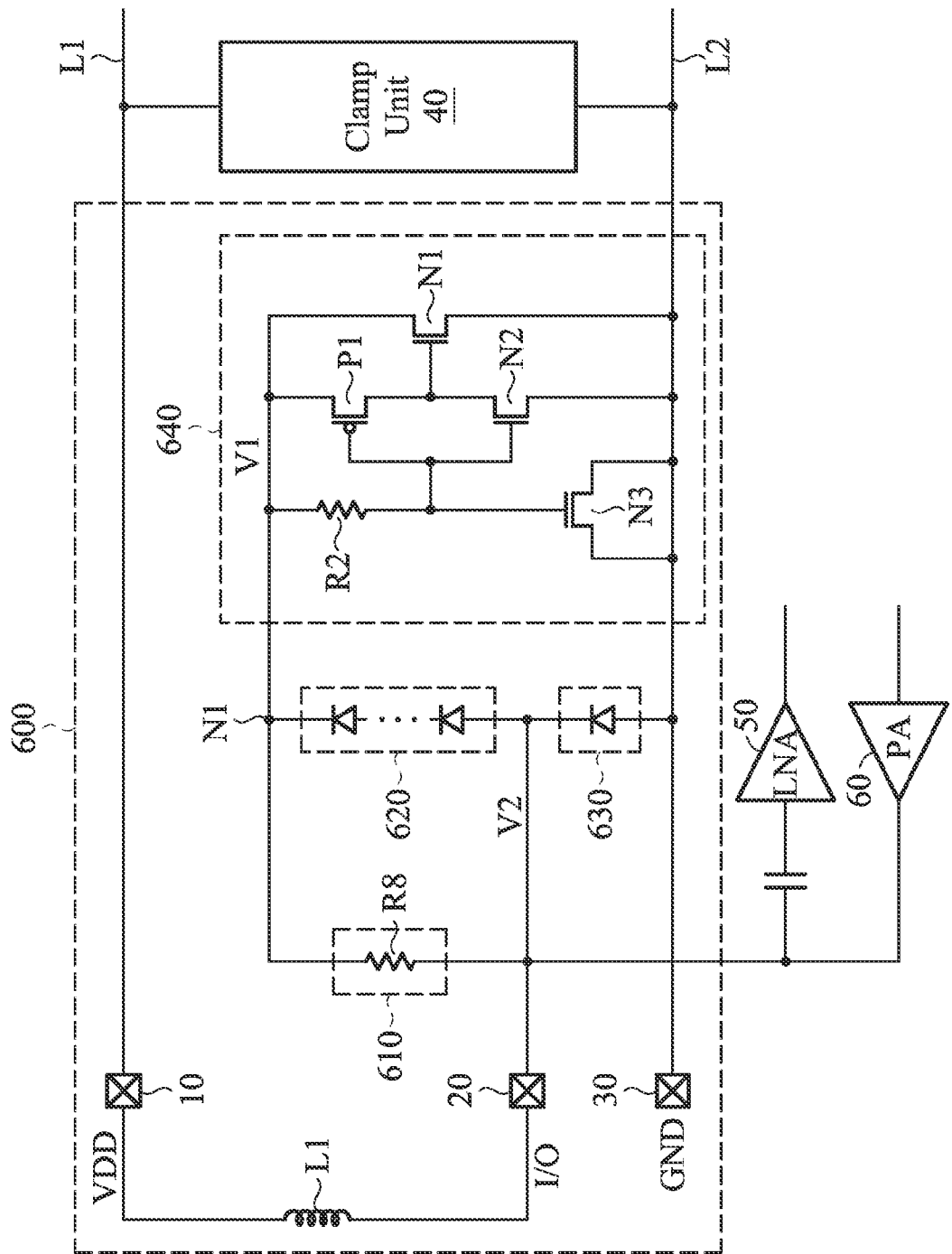
FIG. 6 shows an ESD protection circuit 600 according to another embodiment of the invention.

FIG. 6 shows an ESD protection circuit 600 according to another embodiment of the invention. The ESD protection circuit 600 comprises an impedance device 610, the clamp units 620, 630 and 640 and a bias unit 650. In the embodiment, the impedance device 610 comprises a resistor R8 coupled in parallel with the clamp unit 620, wherein the resistor R8 has a high resistance. Furthermore, the bias unit 650 is an external inductor L1 coupled between the power pad 10 and the I/O pad 20. The inductor L1 may be a choke or matching for the internal circuits, such as PA or LNA. In the embodiment, the voltage V2 of the I/O pad 20 is biased to the power voltage VDD via the inductor L1, and the voltage V1 of the node N1 is pulled to the power voltage VDD via the resistor R8. Furthermore, PSRR is increased because the power line L1 is isolated with the inductor L1 (i.e. the power pad 10 does not directly connected to the clamp cell 640). In the embodiment, a voltage swing at the I/O pad 20 should be smaller than a voltage level $V_{SW7}(V_{SW7}=V_D \times N+V_{RLB})$, where $V_D$ represents a built-in voltage of a diode (e.g. 0.7V), N represents the number of the stacked diodes of the clamp unit 620, and $V_{RLB}$ represents a maximum voltage level of the voltage V1 that is determined according to the reliability of the clamp unit 640. Furthermore, to avoid turning on the diode of the clamp unit 630, the voltage swing at the I/O pad 20 should be smaller than a voltage level $V_{SW8}(V_{SW8}=VDD+V_D)$, where $V_D$ represents a built-in voltage of a diode (e.g. 0.7V). Therefore, a maximum allowable voltage swing at the I/O pad 20 is a minimum value between the voltage levels $V_{SW7}$ and $V_{SW8}$. In one embodiment, the ESD protection circuit 600 further comprises the clamp unit 40.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrostatic discharge (ESD) protection circuit, comprising:
    a first resistor having a first end coupled to a power line, and a second end coupled to a pad, avoiding swing voltage of signal at the pad influencing power voltage of the power line, wherein the first resistor is not on a discharging path;
    a first clamp unit coupled between the second end of the first resistor and a ground line;
    a second clamp unit coupled between the first resistor and the pad, conducting an ESD current caused by positive voltage ESD pulses from the pad to the first clamp unit;
    a third clamp unit coupled between the pad and the ground line, conducting an ESD current by negative voltage ESD pulses from the ground line to the pad; and
    a bias unit coupled to the pad, providing a bias voltage at the pad,
    wherein no ESD current flows through the first resistor when an ESD event occurs at the pad,
    wherein the bias unit comprises:
    a third resistor coupled between the power line and the pad; and
    a fourth resistor coupled between the pad and the ground line, wherein the bias voltage is determined according to the third and fourth resistors.

2. The ESD protection circuit as claimed in claim 1, wherein the bias unit comprises:
    a second resistor coupled in parallel with the second clamp unit.

3. The ESD protection circuit as claimed in claim 1, wherein the bias unit further comprises:
    a current mirror unit coupled between the power line and the third resistor, providing a bias current to the third resistor,
    wherein the bias voltage is determined according to the third resistor and the bias current.

4. The ESD protection circuit as claimed in claim 1, wherein the first resistor has a high resistance.

5. The ESD protection circuit as claimed in claim 1, wherein the second clamp unit comprises at least one diode coupled in a forward conduction direction from the pad to the first clamp unit, and the third clamp unit comprises at least one diode coupled in a forward conduction direction from the ground line to the pad.

6. The ESD protection circuit as claimed in claim 1, wherein the second clamp unit comprises at least one PMOS transistor, and the third clamp unit comprises at least one NMOS transistor.

7. The ESD protection circuit as claimed in claim 1, wherein the first clamp unit comprises:
    a first NMOS transistor coupled between the impedance device and the ground line;
    a first PMOS transistor coupled between the impedance device and a gate of the first NMOS transistor;
    a second NMOS transistor coupled between the gate of the first NMOS transistor and the ground line, having a gate coupled to a gate of the first PMOS transistor;
    a fifth resistor coupled between the impedance device and the gate of the first PMOS transistor; and
    a capacitor coupled between the gate of the first PMOS transistor and the ground line.

8. The ESD protection circuit as claimed in claim 7, wherein the capacitor is formed by a third NMOS transistor, wherein the third NMOS transistor has a gate coupled to the gate of the first PMOS transistor, a drain coupled to the ground line and a source coupled to the ground line.

9. An electrostatic discharge (ESD) protection circuit, comprising:
    an inductor coupled between a power line and a pad;
    a first clamp unit coupled between the pad and a ground line;
    a first resister coupled between the pad and the first clamp unit; and
    a second clamp unit coupled in parallel with the first resister, conducting an ESD current caused by positive voltage ESD pulses from the pad to the first clamp unit.

10. The ESD protection circuit as claimed in claim 9, further comprising:
    a third clamp unit coupled between the pad and the ground line, conducting an ESD current by negative voltage ESD pulses from the ground line to the pad.

11. The ESD protection circuit as claimed in claim 10, wherein the second clamp unit comprises at least one diode coupled in a forward conduction direction from the pad to the first clamp unit, and the third clamp unit comprises at least one diode coupled in a forward conduction direction from the ground line to the pad.

12. The ESD protection circuit as claimed in claim 10, wherein the second clamp unit comprises at least one PMOS transistor, and the third clamp unit comprises at least one NMOS transistor.

13. The ESD protection circuit as claimed in claim 9, wherein the first clamp unit comprises:
    a first NMOS transistor coupled between the impedance device and the ground line;
    a first PMOS transistor coupled between the impedance device and a gate of the first NMOS transistor;
    a second NMOS transistor coupled between the gate of the first NMOS transistor and the ground line, having a gate coupled to a gate of the first PMOS transistor;

a second resistor coupled between the impedance device and the gate of the first PMOS transistor; and a capacitor coupled between the gate of the first PMOS transistor and the ground line.

14. The ESD protection circuit as claimed in claim 13, wherein the capacitor is formed by a third NMOS transistor, wherein the third NMOS transistor has a gate coupled to the gate of the first PMOS transistor, a drain coupled to the ground line and a source coupled to the ground line.

* * * * *